United States Patent
Kao

(10) Patent No.: US 6,235,246 B1
(45) Date of Patent: *May 22, 2001

(54) REACTOR HAVING BELLOWS EXPANSION UNIT BETWEEN CATALYST ADDITION/WITHDRAWAL CONDUIT AND GRID PLATE

(75) Inventor: Thomas Y. Kao, Voorhees, NJ (US)

(73) Assignee: IFP North America, Inc., Princeton, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,820

(22) Filed: Jan. 5, 1998

(51) Int. Cl.[7] .............................. B01J 8/18; F27B 15/00; F16L 51/02

(52) U.S. Cl. ...................... 422/145; 422/139; 422/143; 285/226

(58) Field of Search ..................... 422/139–145, 422/310–311, 221; 285/114–115, 136.1–145.5, 226–229

(56) References Cited

U.S. PATENT DOCUMENTS

| | | | |
|---|---|---|---|
| 3,475,134 | * 10/1969 | Weber et al. | 422/140 |
| 4,095,974 | * 6/1978 | Matovich | 75/345 |
| 4,317,798 | * 3/1982 | Worley | 422/144 |
| 4,348,354 | * 9/1982 | Artaud et al. | 376/405 |
| 4,687,639 | * 8/1987 | Whiteside, II | 422/112 |

* cited by examiner

Primary Examiner—Marian C Knode
Assistant Examiner—Alexa A. Doroshenk
(74) Attorney, Agent, or Firm—John F. Ritter

(57) ABSTRACT

A pressurized vertically-oriented catalytic reactor vessel has a fluid flow distribution grid plate fixedly mounted transversely in the reactor lower portion for supporting a bed of particulate catalyst above the grid plate, and has at least one elongated conduit for catalyst addition/withdrawal extending upwardly through the reactor lower head and the grid plate. The catalyst addition/withdrawal conduit has a concentric bellows type expansion unit sealably attached at its lower end to the upper side of the grid plate, the bellows unit being sealably attached at its upper end to the catalyst conduit, so that the conduit can thermally expand vertically, and gas leakage cannot occur around the conduit and the grid plate into the catalyst bed.

7 Claims, 2 Drawing Sheets

REACTOR HAVING BELLOWS EXPANSION UNIT BETWEEN CATALYST ADDITION/WITHDRAWAL CONDUIT AND GRID PLATE

BACKGROUND OF INVENTION

This invention pertains to fluidized bed type catalytic reactors. It pertains particularly to such reactors having an addition/withdrawal conduit for particulate catalyst extending through a flow distribution grid plate located in the reactor lower portion, with the conduit being sealably attached to the grid plate by a bellows type expansion unit.

A known pressurizable ebullated bed catalytic reactor adapted for operation at elevated temperature and pressure conditions and having a lower grid plate for supporting a bed of particulate catalyst, with the grid plate containing multiple riser tubes each covered by a bubble cap for upward fluid flow is generally disclosed by U.S. Pat. No. 3,475,134 to Weber et al. Particulate catalyst is periodically added to and withdrawn from the reactor ebullated bed through an elongated conduit extending upwardly through the reactor lower head and through the grid plate. From past operating experience, such conduits have been a problem because they sometimes fail prematurely near the grid plate due to severe erosion by the randomly moving catalyst particles in the ebullated bed. Such erosion by the catalyst particles is apparently caused by hydrogen gas passing at high velocity through gaps which sometimes occur in a split flange type seal which is usually used around the conduit above the grid plate, for permitting necessary vertical thermal expansion movement of the conduit relative to the grid plate. Because of these undesired erosion problems in such reactors, an improved configuration for sealably attaching the catalyst addition/withdrawal conduit to the reactor grid plate is needed.

SUMMARY OF INVENTION

This invention provides a pressurizable fluidized bed catalytic reactor having an innovative construction for sealably attaching an elongated catalyst addition/withdrawal conduit to a flow distribution grid plate in the reactor lower portion, by providing a concentric bellows type expansion unit located adjacent to the outside surface of the conduit portion which protrudes through the grid plate and into the reactor catalyst bed. The invention includes the pressurizable reactor vessel having the grid plate fixedly mounted transversely in the reactor lower portion for supporting a bed of particulate catalyst, and arranged for upward fluid flow distribution therethrough. The reactor has the elongated catalyst addition/withdrawal conduit extending through the reactor lower head and upwardly through the grid plate into the catalyst bed, and a concentric bellows unit is sealably attached at its lower end to the grid plate and is sealably attached at the bellows unit upper end to the conduit. The reactor is adapted for sustained operation at elevated temperature of 600–900° F. and pressure of 500–3000 psig. The bellows unit of this invention is suitable to accommodate both radial and vertical thermal expansion of the elongated conduit relative to the grid plate.

The bellows type expansion unit configuration of this invention advantageously provides a flexible and reliable sealing means around the catalyst addition/withdrawal conduit portion extending above the grid plate. The bellows unit cost can be traded off against the cost of a previously used split flange joint sealing arrangement for which undesired erosion problems have been experienced.

BRIEF DESCRIPTION OF DRAWINGS

This invention will be described further with reference to the following drawings, in which.

DESCRIPTION OF INVENTION

Figure 1:
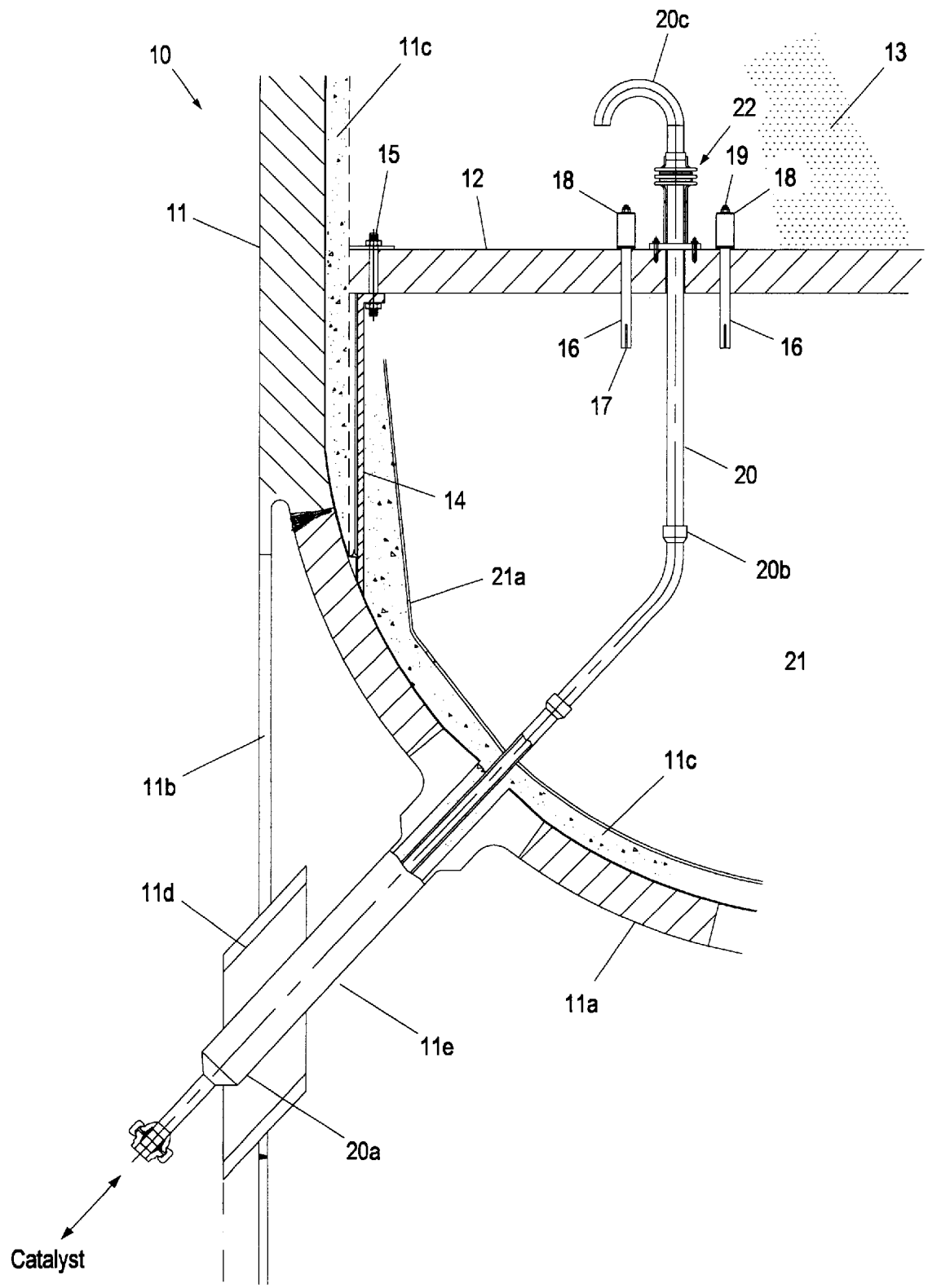
FIG. 1 shows a partial cross-sectional elevation view of a fluidized bed catalytic reactor having an elongated conduit extending upwardly through the reactor grid plate for catalyst addition/withdrawal and including a bellows unit located above the grid plate according to the invention.
Figure 2:
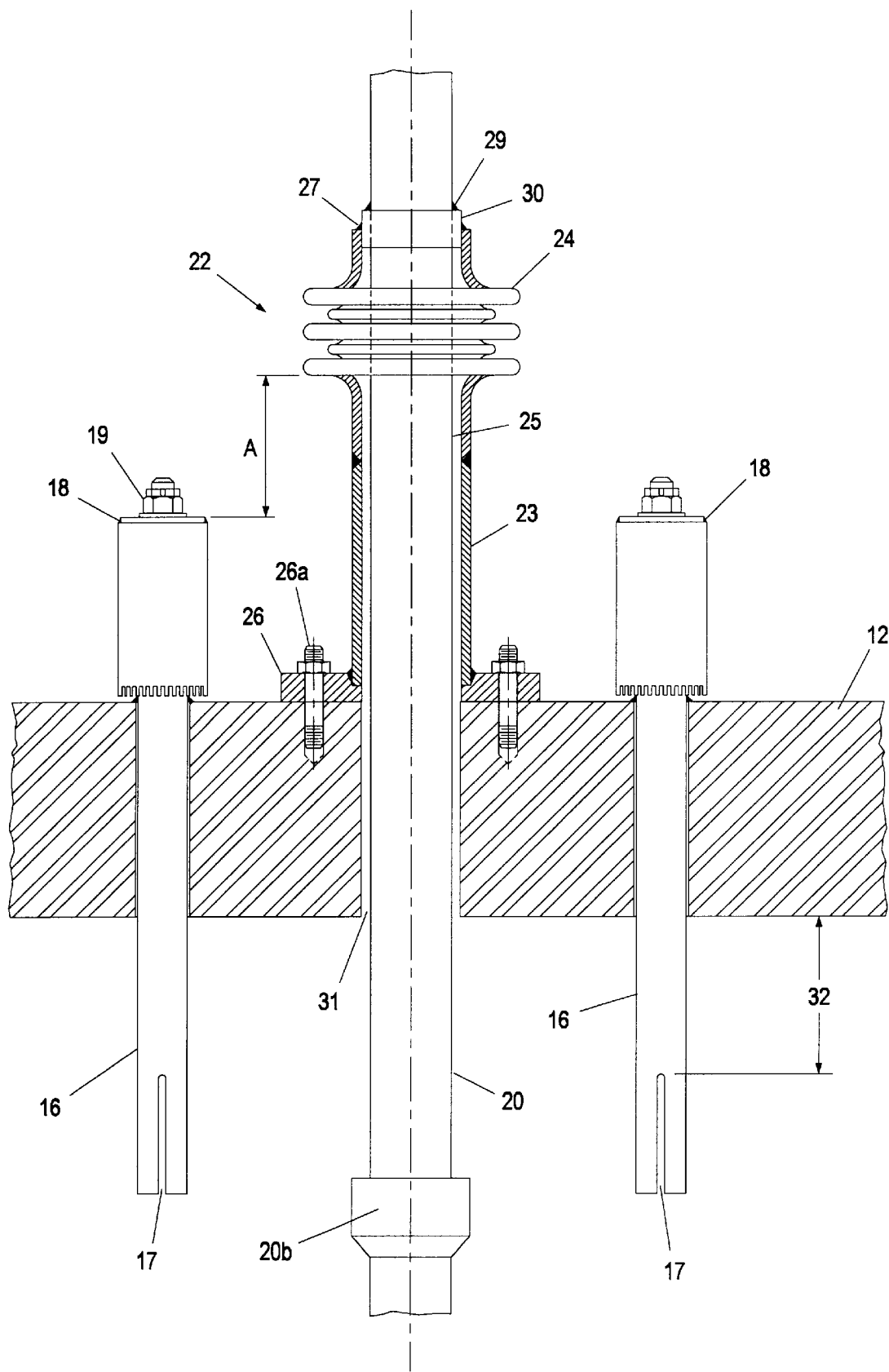
FIG. 2 shows an enlarged cross-sectional elevation view of a reactor grid plate with a conduit extending upwardly through the grid plate and pressure sealed by a bellows unit configuration according to the invention.

As shown by FIGS. 1 and 2, a vertically-oriented pressurizable ebullated bed type catalytic reactor vessel 10 includes a cylindrical-shaped wall 11, a lower hemispherical head 11a welded pressure-tightly onto the wall and a reactor support skirt 11b. The reactor 10 may have an inner thermal insulation layer 11c provided against the cylindrical wall 11 and head 11a. The reactor has a grid plate 12 fixedly mounted transversely in the reactor lower portion for upward fluid flow distribution into a catalyst bed 13. The grid plate 12 is sealably attached to the reactor bottom head 11a by a cylindrical shaped support skirt ring 14 and a circumferential bolted joint 15, and supports the particulate catalyst bed 13 located above the grid plate 12. Multiple riser tubes 16 are provided extending vertically through the grid plate 12 for upward uniform flow of gas and liquid, each tube having its lower end slotted at 17 and its upper end portion covered by a bubble cap 18, fixedly attached to the tube 16 by a bolt and nut at 19.

An elongated conduit 20 for catalyst addition/withdrawal from catalyst bed 13 extends from outside the reactor 10 through opening 11d in the support skirt 11b, and is attached pressure-tightly at 20a to an elongated sleeve 11e which is attached pressure tightly at its upper end to the reactor lower head 11a. The conduit 20 extends upwardly through a plenum space 21 which is lined by a metal casing 21a and through the grid plate 12. The conduit 20 may include at least one coupling joint 20b, and may have an upper return bend 20c shaped for substantially excluding catalyst particles in the bed 13 from entering the conduit, except during any particulate catalyst withdrawal operations from the bed.

The catalyst addition/withdrawal conduit 20 which enters the reactor 10 through the lower head 11a will become elongated towards the center of the reactor and upwards towards the top of the reactor as the reactor reaches its normal high temperature operation conditions. Because there is usually inadequate space for providing an expansion loop in the conduit 20 within the plenum space 21 below the grid plate 12, this arrangement requires that the conduit 20 be able to slide vertically relative to the grid plate 12. An expansion bellows unit 22 which is provided sealably attached to the conduit 20 will not only seal off any possible gas or catalyst leakage through the grid plate 12 and around the conduit 20, but it will also provide for thermal expansion of the catalyst addition/withdrawal conduit 20 relative to the reactor wall 11 and head 11a and the grid plate 12. Such thermal expansion occurs during reactor startup operations while the reactor reaches its usual operating condition of 600–900° F. temperature and 500–3000 psig pressure.

As best shown by FIG. 2, the concentric bellows unit 22 includes an elongated outer sleeve element 23 sealably attached to a bellows element 24 and surrounds that portion of the conduit 20 located immediately above the grid plate 12. The lower end of the bellows element 24 should be located above the bubble caps 18 by a distance "A" of at least 3 inches, and need not exceed about 6 inches. The elongated outer sleeve 23 and the bellows element 24 of the bellows unit 22 of this invention each have an inner diameter slightly larger than the outer diameter of the protruding conduit 20, so as to provide an annular clearance space 25 between the conduit 20 and sleeve 23 to permit necessary axial movement of the conduit 20 relative to the grid plate 12. The clearance space 25 should have a radial clearance of at least about 0.12 inch to accommodate radial thermal expansions, and the radial clearance need not exceed about 0.30 inch. The outer sleeve 23 is attached pressure-tightly at its lower end to the upper surface of the reactor grid plate 12 by means of a bolted flange 26 and stud bolts and nuts 26a. The bellows element 24 is attached pressure-tightly at its upper end to the outside diameter of the conduit 20 by a seal weld 27. Alternatively if desired, the bellows 24 may be seal welded at 27 to a reinforcing collar ring 30, with the collar being seal welded at 29 to the conduit 20. Also, a lower annular clearance space 31 is provided between the grid plate 12 and the conduit 20 similar to the upper clearance space 25.

During operations of the catalytic reactor 10, the bellows expansion unit 22 will be loaded in tension and will not encounter any problems from catalyst accumulation from bed 13 at the outside of the bellows element 24. During such reactor operations, the lower annular space 31 provided between the grid plate 12 and the annular space 25 inside the bellows unit 22 and the outside surface of the conduit 20 will be filled with hydrogen gas from a gas buffer zone 32 provided below the grid plate 12 and above the riser tube gas entry slots 17, so that there will be no undesired coke formation in these annular spaces during reactor extended operations. During such operations, the pressure within annular space 25 will exceed the pressure in ebullated bed 13 by a differential pressure of 10–40 psi, and preferably by 15–30 psi differential pressure. The bellows element 24 is suitable for accommodating the differential pressure, and also provides a vertical movement for the conduit 20 relative to the grid plate 12 of 1–3 inches.

With this reactor design improvement for the addition/withdrawal conduit 20, the multiple riser tubes 16 and attached bubble caps 18 located above the grid plate 12 will provide better liquid and vapor flow distribution from the plenum space 21 upwardly into the catalyst bed 13, and there will be less potential for coking in the catalyst bed due to any undesired short circuit of hydrogen gas passage through the split-flange type seal which was previously used around the conduit 20.

If desired, the reactor 10 may have two separate catalyst addition/withdrawal conduits extending upwardly through the grid plate 12, the first conduit 20 being for catalyst addition upwardly into the fluidized bed 13, and a second conduit (not pictured) provided for catalyst withdrawal downwardly from the fluidized bed 13. Each separate conduit 20 the other not pictured extending through the grid plate 12 is provided with a bellows unit 22 attached pressure-tightly at its lower end to the grid plate 12, and attached at its upper end pressure-tightly to each conduit similarly as described above. Also, the catalyst addition conduit 20 has its upper end terminated at a level above the upper end of catalyst withdrawal conduit (not pictured).

This invention will be further described by a typical construction example, which should not be construed as limiting in its scope.

EXAMPLE

A vertically-oriented catalytic reactor is provided having a bed of particulate catalyst supported above a flow distribution grid plate located in the reactor lower portion. An elongated conduit for catalyst addition/withdrawal extends upwardly through the reactor lower head and the grid plate, and is sealably attached to the grid plate upper side by a bellows unit. Important dimensions and relationships for the reactor and the bellows unit are as follows:

| | |
|---|---|
| Reactor outside diameter, ft. | 15 |
| Reactor wall thickness, in. | 8 |
| Reactor operating temperature, °F. | 700–800 |
| Reactor operating pressure, psig | 2000 |
| Grid plate thickness, in. | 12 |
| Conduit outside diameter, in. | 3 |
| Bellows and sleeve inside diameter, in. | 3.5 |
| Radial clearance between conduit and bellows, in. | 0.25 |
| Vertical movement of conduit relative to grid plate, in. | 2 |
| Vertical distance (A) between bubble caps and bellows, in. | 6 |
| Catalyst particle size, in. | 0.030–0.060 |

Because the bellows unit is sealably attached at its lower end to the grid plate and is sealably attached at its upper end to the catalyst addition/withdrawal conduit, the conduit has adequate horizontal and vertical movement relative to the grid plate, and hydrogen gas leakage from below the grid plate around the conduit is prevented.

Although this invention has been described broadly and also includes a preferred embodiment, it will be understood that modifications and variations can be made within the scope of the invention which is defined by the following claims.

I claim:

1. A pressurizable vertically-oriented reactor assembly having a cylindrical-shaped wall attached to a lower head and having a flow distribution grid plate fixedly attached transversely within the reactor lower portion for supporting a bed of particulate catalyst, the grid plate containing multiple riser tubes each covered at its upper end by a cap, the reactor further comprising:

at least one elongated conduit attached pressure-tightly at its lower end to the reactor lower head and extending upwardly through the reactor lower head and the grid plate; and a bellows unit sealably attached at its lower end to the grid plate upper side and attached at its upper end to the outside surface of said elongated conduit; and said bellows unit separate from, and concentrically configured around, said elongated conduit; and whereby during reactor operations and temperature cycling, said bellows unit allows the elongated conduit to expand upwardly relative to the grid plate, and particulate catalyst can be passed through the elongated conduit into the catalyst bed, without gas passing around the conduit and upwardly trough the grid plate.

2. The reactor vessel assembly according to claim 1, wherein said bellows unit includes a lower sleeve element sealably attached to the grid plate and an upper bellows element sealably attached to said conduit.

3. The reactor vessel assembly according to claim 1, wherein said bellows unit has an inner diameter sufficiently larger than the conduit outer diameter to provide a radial clearance of 0.12–0.30 inch, said bellows unit being attached at its lower end to the grid plate by a flange bolted onto the grid plate upper side.

4. The reactor vessel assembly according to claim 1, wherein the bellows element is located 3–12 inches above caps for the multiple riser tubes of said grid plate.

5. The reactor vessel assembly according to claim 1, wherein said elongated conduit is attached at its lower end to an elongated sleeve portion of the reactor lower head.

6. The reactor vessel assembly according to claim 1, wherein said bellows unit provides for a differential pressure of 10–40 psi.

7. The reactor vessel according to claim 1, wherein said bellows unit provides for a vertical movement for said conduit of 1–3 inches.

\* \* \* \* \*